United States Patent [19]
Tehon

[11] Patent Number: 4,676,663
[45] Date of Patent: Jun. 30, 1987

[54] ARRANGEMENT FOR REMOTE ULTRASONIC TEMPERATURE MEASUREMENT

[75] Inventor: Stephen W. Tehon, Clay, N.Y.

[73] Assignee: General Electric Company, Syracuse, N.Y.

[21] Appl. No.: 875,258

[22] Filed: Jun. 17, 1986

Related U.S. Application Data

[63] Continuation of Ser. No. 613,317, May 23, 1984, abandoned.

[51] Int. Cl.$^4$ ............................................. G01K 11/24
[52] U.S. Cl. ..................................... 374/119; 374/117
[58] Field of Search ...................... 374/117, 118, 119; 310/313 R, 321, 322, 323, 333; 331/155; D14/57

[56] References Cited

U.S. PATENT DOCUMENTS

| | | | |
|---|---|---|---|
| 3,399,570 | 9/1968 | Pirlet | 374/119 |
| 3,540,265 | 11/1970 | Lynnworth | 374/119 |
| 3,595,082 | 7/1971 | Miller, Jr. | 374/119 |
| 4,077,023 | 2/1978 | Boyd et al. | 310/333 |
| 4,249,418 | 2/1981 | Ebata | 374/117 |
| 4,398,115 | 8/1983 | Gagnepain et al. | 374/117 |

OTHER PUBLICATIONS

"Flexible Capillary Ultrasonic Delay Lines," Rosenberg et al., IEEE Transaction on Sonics and Ultrasonics, vol. SU24, No. 1, 1/1977.
"Interior-Surface Acoustic Waveguiding in Capillaries," Rosenberg et al., Applied Physics Letters, vol. 25, No. 6, 9/1974.
"Acoustic Clad Fiber Delay Lines," Boyd et al., IEEE Transactions on Sonics and Ultrasonics, vol. SU24, No. 4, 7/1977.
"Elastic Waves in Rods and Clad Rods," Thurston, JASA 61, No. 6, 6/1977, pp. 1–37.
"Relationship Between Plate and Surface Modes of a Tube," JASA 61, No. 6, 6/1977, pp. 1409–1502.

Primary Examiner—Charles Frankfort
Assistant Examiner—Patrick R. Scanlon
Attorney, Agent, or Firm—Richard V. Lang; Carl W. Baker; Fred Jacob

[57] ABSTRACT

The invention relates to an arrangement for remote ultrasonic temperature measurement. The arrangement employs a sensor, which in turn comprises an electromechanical transducer, a sensing element, and a hollow ultrasonic waveguide for coupling the sensing element to the transducer. The transducer is designed to propagate surface waves of a torsional or a radial shear mode upon the internal surface of the waveguide. The walls of the waveguide are made sufficiently thick, such that supporting clamps applied to the exterior of the waveguide have no adverse affect on interior wave propagation. The sensing element may be of either a hollow construction using internal surface wave propagation for protection of the active interior surface of the sensing element or of a solid construction in which the active outer surface of the sensing element may be exposed to the environment.

1 Claim, 6 Drawing Figures

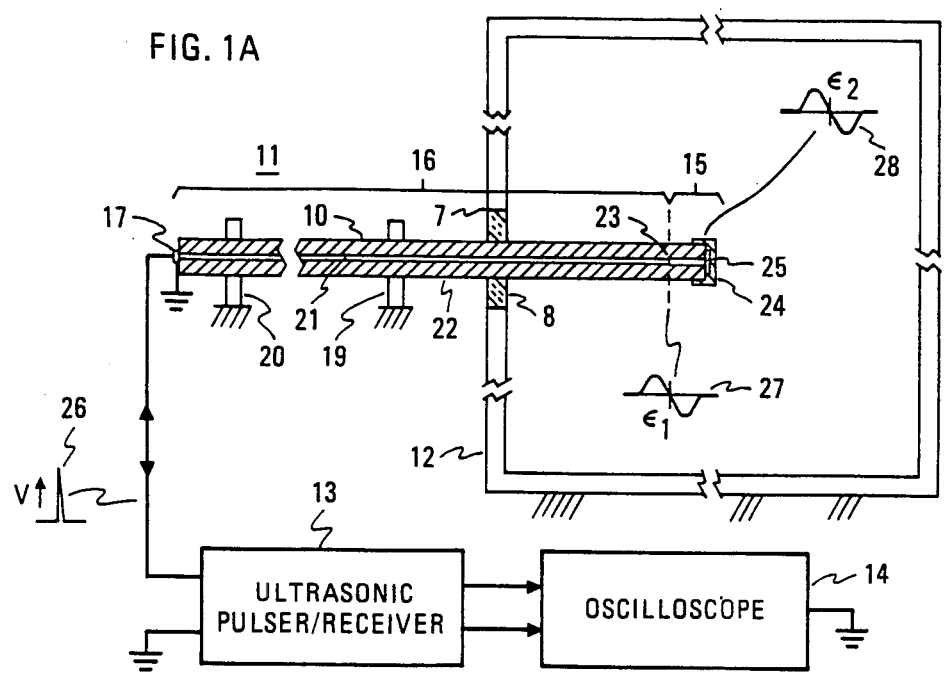
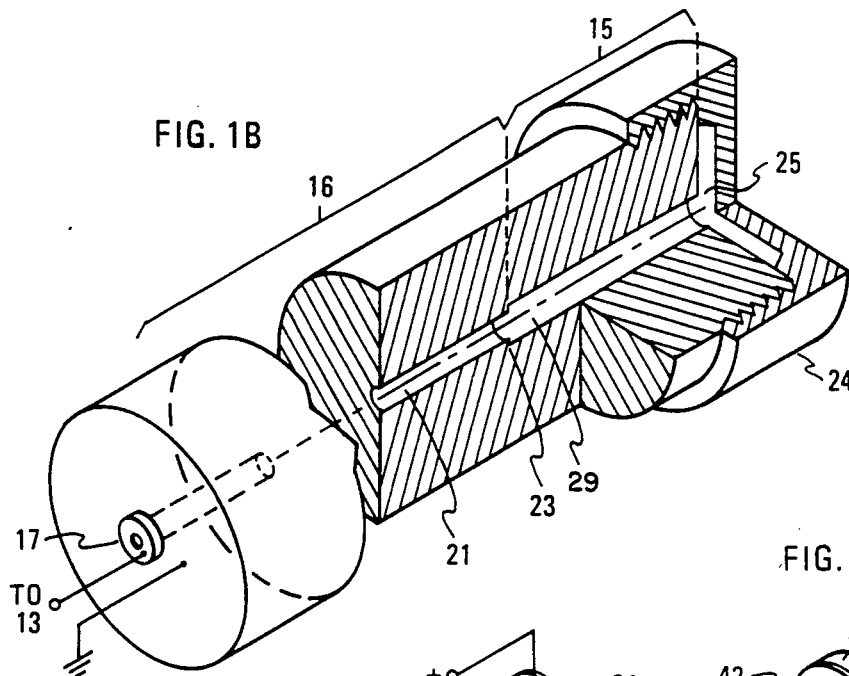
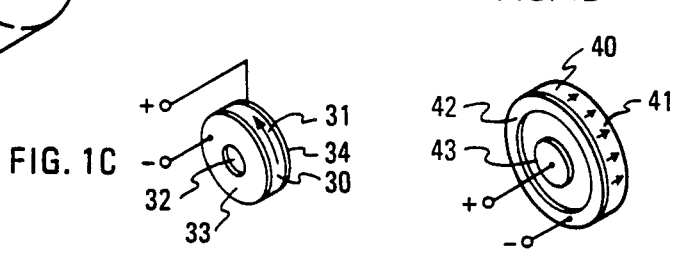

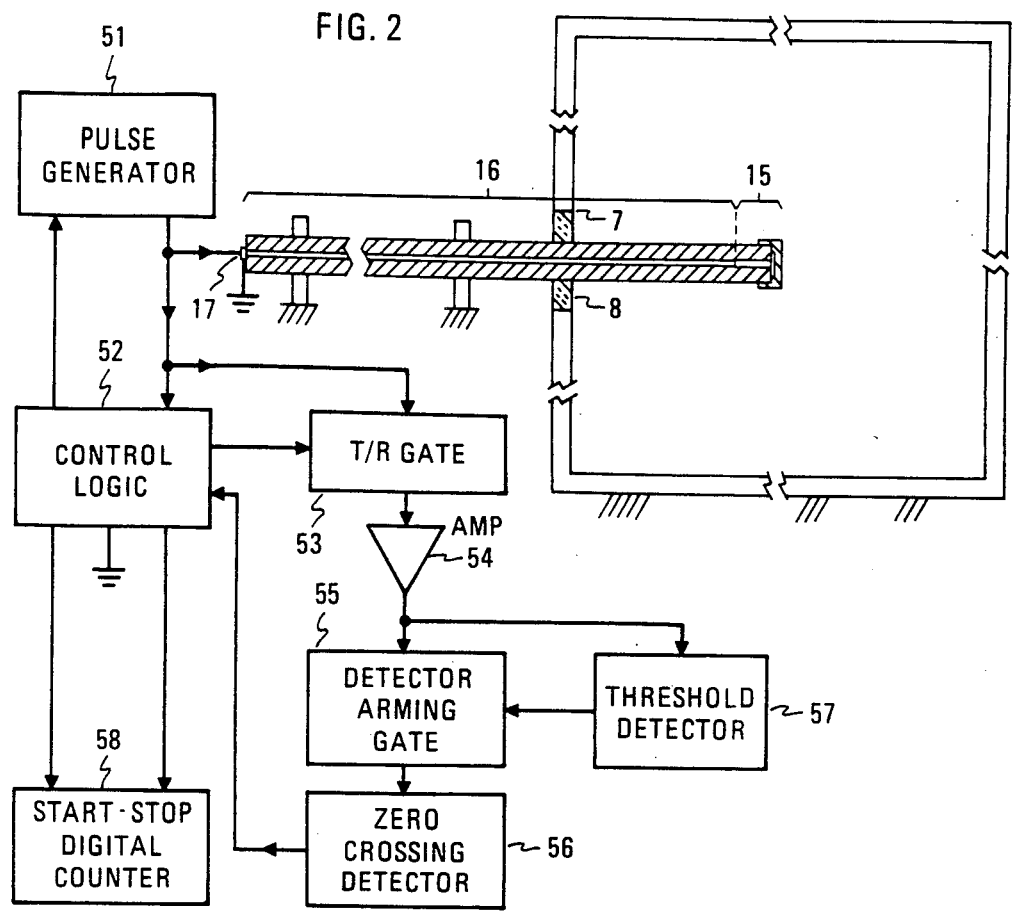
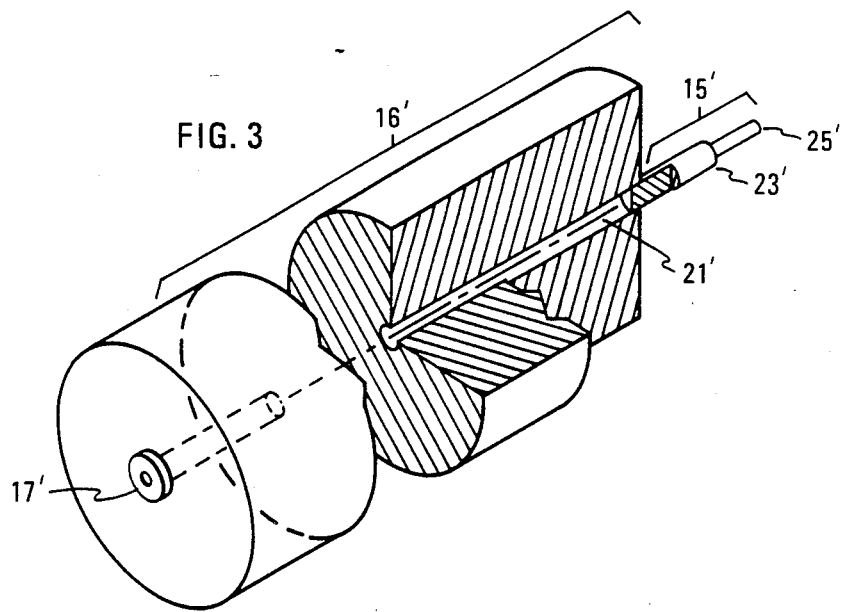

ARRANGEMENT FOR REMOTE ULTRASONIC TEMPERATURE MEASUREMENT

This application is a continuation of application Ser. No. 613,317, filed May 23, 1984 and now abandoned.

RELATED APPLICATION

The present application is related to an application of S. W. Tehon entitled "Arrangement for Ultrasonic Temperature Measurement Using a Resonant Sensor" Ser. No. 613,318 filed concurrently herewith and now U.S. Pat. No. 4,650,346.

BACKGROUND OF THE INVENTION

1. Field of the Invention

The present invention relates to ultrasonic temperature measurement and more particularly to a novel remote ultrasonic temperature sensor.

2. Description of the Prior Art

It is well known that the elastic modulus of a material is temperature dependent, that the temperature may be measured by measuring the velocity of propagation of acoustic waves in the material. The most common method of measurement is to use a transit time or time of flight measurement, in which reflections are produced at two different locations in a sensing element. Since the "time of flight" should be measured in material exposed to the same temperature, and since the electromechanical transducer cannot ordinarily be exposed to high temperatures, it is conventional to provide an acoustic coupling means between the transducer in a normal environment and the coupling element in the high temperature environment. Unfortunately, conventional solid rods used for acoustic coupling require supporting clamps, which interfere with the coupling function by generating unwanted reflections.

SUMMARY OF THE INVENTION

Accordingly, it is an object of the present invention to provide an improved ultrasonic temperature sensor.

It is another object of the invention to provide an improved remote ultrasonic temperature sensor in which the temperature sensing element may be remotely placed in relation to an electromechanical transducer and electronics.

It is still another object of the invention to provide a remote ultrasonic temperature sensor having an improved coupling element for coupling the temperature sensing element to the electromechanical transducer.

These and other objects of the invention are achieved in an ultrasonic temperature measuring arrangement comprising an ultrasonic temperature sensor and associated electrical means. The ultrasonic temperature sensor comprises an electromechanical transducer, a sensing element, and a coupling element for coupling the transducer to the sensing element.

The coupling element has a first end, a second end and an internal cylindrical surface extending between the ends for propagating an acoustic interior surface wave with axial symmetry. These are preferably torsional or radial shear waves. The wall thickness of the coupling element is chosen greater than the depth of penetration of the surface waves to permit external mechanical support without significant affect upon the propagation of the interior waves. This dictates that the design provide at least an approximate 10 to 1 ratio between outer and inner diameter.

The electromechanical transducer is mechanically coupled to the first end of the coupling element and has a pair of electrical terminals. When the transducer is electrically energized, it launches acoustic surface waves having axial symmetry (e.g. torsional waves) upon the interior surface of the coupling element toward the second end. When the transducer is electrically unenergized, it provides an electrical output in response to acoustic waves propagating on the interior surface of the coupling element and impinging on the first end.

The sensing element is a second acoustic wave propagating element for temperature sensing subjected to the thermal conditions being measured and acoustically coupled to the coupling element. In a practical construction, the sensing element has a first and a second discontinuity between which the velocity of wave propagation is a function of a temperature dependent elastic modulus.

The electrical circuit means, which are coupled to the electrical terminals of the transducer, apply an electrical wave to the transducer to launch acoustic waves and respond to the transducer output voltages reflected when acoustic waves impinge on the transducer. The electrical circuit means determine the difference in times of receipt of reflections from the first and second discontinuities. This time difference is used as a measure of the temperature dependent velocity of wave propagation in the sensing element and it is used to measure the temperature.

The coupling element, which propagates interior surface waves may readily be used with a sensor which also propagates interior surface waves or a sensor which operates in a torsional mode and is exposed to the temperature conditions being measured.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

FIG. 1A is an illustration of an arrangement for ultrasonic temperature measurement suitable for laboratory use, the arrangement utilizing a remote ultrasonic temperature sensor in accordance with a first embodiment of the invention;

FIG. 1B illustrates the sensor which comprises a temperature sensing element, subjected to the thermal conditions being measured, a waveguide element for coupling the sensing element in the hostile thermal environment to an associated transducer and electronics in a benign thermal environment, and the transducer per se. In the FIGS. 1A, 1B arrangements, both the waveguide coupling element and the sensing element propagate interior surface waves;

FIG. 1C illustrates a first piezoelectric transducer suitable for use in the remote sensors illustrated in FIGS. 1A, 2 and 3, and which generates and responds to torsional acoustic interior surface waves;

FIG. 1D illustrates a second piezoelectric transducer suitable for use in the remote sensors illustrated in FIGS. 1A, 2 and 3, and which generates and responds to radial shear acoustic interior surface waves;

FIG. 2 is a simplified block diagram of an ultrasonic temperature measurement arrangement applicable to a commercial implementation and utilizing the remote sensor illustrated in FIG. 1A; and FIG. 3 is an illustration of a second, novel remote ultrasonic temperature sensor in which the sensing unit, while utilizing a waveguide for propagating acoustic interior surface waves for coupling the sensing element to the associated transducer and electronics, utilizes a sensing element typically operating in an extensional or torsional mode.

DESCRIPTION OF THE PREFERRED EMBODIMENT

An arrangement for ultrasonic temperature measurement suitable for laboratory use, and using a novel remote ultrasonic temperature sensor 11 using interior surface wave propagation is illustrated in FIG. 1A. The sensor 11 is shown in an application in which it is designed to measure the temperature of an oven 12 in cooperation with an ultrasonic pulser 13, an oscilloscope 14, and a calibration chart (not specifically illustrated).

The remote ultrasonic temperature sensor 11 consists of three principal elements. These elements include the temperature sensing element 15, which is an acoustic wave propagating element introduced within the oven 12 for sensing its temperature, a coupling element 16 in the form of a hollow waveguide for coupling acoustic interior surface waves between the sensing element in the oven and a transducer 17 at normal ambient temperatures, and the transducer 17 which launches and responds to returning acoustic waves.

The construction of the sensor 11 is illustrated in FIGS. 1A and 1B. The principal structural member 10 of the sensor is of a tubular configuration, having a relatively small central opening 21, which extends substantially the length of the member and which provides an internal cylindrical surface upon which acoustic interior surface waves with axial symmetry may propagate. The inner diameter of the member 10 is made small in relation to the outer diameter so that the wall thickness will be greater than the depth of penetration of the surface waves propagated on the internal surface and thus permit mechanical support of the sensor without adversely affecting the propagation of the surface waves upon the interior. In the FIG. 1 embodiment, both the coupling element 16 and sensing element 15 are formed upon the tubular member 10.

The transducer 17 of the sensor 11 is shown at the leftmost end of the sensor in FIGS. 1A and 1B. In these illustrations, the transducer is a torsional electromechanical transducer similar to that illustrated in FIG. 1C. The transducer 17 is mechanically coupled to the leftmost end of the member 10 and includes a pair of electrical terminals, which when suitably energized, generate torsional acoustic surface waves on the interior surface of a sensor, progressing to the right end of the member 10 in the FIG. 1A illustration. When the transducer 17 is in a non-electrically energized mode, suitable for sensing acoustic waves, acoustic waves returning from the right end of the sensor, and propagating on the interior surface of the structural member, are sensed by the transducer and converted into electrical signals which appear at the transducer's electrical terminals.

The construction of the torsional electromechanical transducer employed in FIGS. 1A and 1B is best illustrated in FIG. 1C. The body of the transducer 30 is a washer-shaped circularly polarized (as illustrated by the arrow 31) piezoelectric ceramic, typically PZT-5 (a lead zirconate titanate) having an outer diameter which is slightly larger than the central chamber 21 of the member 10. In the event that the central chamber 21 is 0.025", the outer diameter of the transducer may be 0.040". In the event that the transducer has a central opening 32, it may have an inner diameter of 0.010". The thickness of the transducer may be 0.010". The near and far faces of the transducer are provided with electrodes 33 and 34, which cover these surfaces and which are the points for electrical connection to the transducer. The transducer is rigidly attached near its perimeter to the leftmost face of the member 10, usually by means of a solder. The outer diameter of the transducer 17 should be slightly larger than the inner diameter of the opening 21 to provide an adequate mechanical connection between the perimeter of the transducer and the inner wall of the chamber 21. This will provide coupling to the interior walls of the cylinder 21 for launching surface waves upon that interior surface.

The transducer 17 generates torsional acoustic waves upon the interior walls in the structural member 10 in the following manner. When the electrodes 33 and 34 are coupled to dissimilar electrical potentials, an axial field is generated throughout the body of the transducer. The body however is polarized in a circular manner as indicated by the arrow 31 in FIG. 1C. Thus, the axial electric field interacting with the circular polarization will generate rotational shearing stress in the piezoelectric body, so that the face with electrode 33 will rotate with respect to the opposite face with electrode 34. The rotational sense of the stresses will reverse if the polarity of the potentials applied to the electrodes is reversed. The center of the transducer 17 is not rigidly supported to preclude rotation of the transducer as a whole, but the stresses that are exerted at the perimeter of the transducer 17 upon the end of the member 10, result from the inertia (e.g. rotational moment) of the transducer per se. The torsional stresses which are generated in the transducer induce corresponding strains in the member 10. The physical arrangement is designed to transfer these stresses to the internal wall of the cylindrical chamber 21 in the member 10 for propagation in a torsional mode upon the interior surface of the wall.

The coupling element 16 in the first embodiment forms the principal part of the tubular member 10 as indicated by the bracket associated with reference numeral 16 extending from the left end of the member 16 to the discontinuity in diameter 23 near the right end. (The discontinuity 23, which is best seen in FIG. 1A defines the beginning of the sensing element.) The diameter of the cross section of the tubular member, i.e. coupling element 16 assuming an internal diameter of 0.025", is typically 0.25", so as to provide a wall thickness which is greater than the depth of the penetration of the surface waves. As earlier noted, this selection of wall thickness permits external mechanical support to the coupling element without significant affect upon the propagation of interior waves. The internal surface or chamber of the tubular member 10, i.e., the coupling element, is cylindrical, preferably smooth, and has the appropriate dimensions to propagate a torsional mode interior surface wave launched from the transducer 17 toward the sensing element 16. For efficient coupling from the transducer 17 to the coupling element, the stated dimensional selections should be made for the outside diameter of the transducer (0.040") and the inside diameter (0.025") of the tubular member. The path that is provided by the coupling element is preferably of low loss by the use of suitable (high Q) materials. At longer distances (e.g. ~100 feet), the cylindrical opening need not be evacuated when a torsional mode is used to avoid losses due to energy exchange with the enclosed gas. As will be explained, the coupling element 16 must also be suitable for coupling torsional mode interior surface waves reflected from the sensing element 15 back into the right end of the coupling element 15 and progressing toward the transducer 17.

The sensing element 15 in the first embodiment forms a short portion of the tubular member 10 at the right end. The location of the sensing element is indicated by a small bracket associated with the reference numeral 15 and extending to the outer extremity of the tubular member 10. An end cap 24, which is not a part of the wave propagation structure, is threaded onto the exterior surface of the tubular member 10 and acts as a barrier to prevent contamination of the interior of the sensing element. As best seen in FIG. 1B, the cap 24 is spaced away from the opening at the end of the tubular member 10.

In the first embodiment, the sensing element 15 is that portion of the tubular member 10 defined between the first discontinuity 23, which is disposed in a propagation path within the tubular member 10 and the second discontinuity which is at the right end of the tubular member. In the first embodiment, there is a propagation path—containing a reflection causing discontinuity at 23, at the union of the coupling element 16 and the sensing element 15. The common propagation path provides propagation for torsional interior surface waves from the coupling element 16 to the sensing element 15, and from the sensing element 15 to the coupling element.

Continuing with the description of sensing element 15, the sensing element is conveniently a portion of the tubular member 10 and has a wall thickness which is significantly greater than the depth of penetration of the surface waves as illustrated in FIGS. 1A and 1B. Since there is no need for support of this end, this dimensional state is unobjectionable but provides little advantage in operation. The interior surface waves which are propagated from the coupling element 16 and coupled to the sensing element 15 are coupled via the discontinuity 23 in the embodiment. The discontinuity 23 represents a small increase in diameter of the cylindrical chamber 29 within the sensing element over the diameter of the cylindrical chamber 21 in the coupling element.

The increase in internal diameter at the discontinuity 23 should provide a reflection back toward the transducer of slightly under half of the incident energy and a non-reflective transmission of slightly over half of the incident energy into the sensing element 15. This can be achieved by increasing the inner diameter about the entire circumference of the cylindrical chamber 29 within the sensing element. The increase is normally less than half the depth of material elastically active in propagation of the interior surface wave. A second means of bringing this division about, is to bore one or two eccentrically placed holes into the end of the tubular member 10. In this way, one or two small steps reflecting slightly under half of the energy will be provided over somewhat less than half of the internal perimeter of the chamber 29.

The sensor 15, 16 and 17 cooperates with the ultrasonic pulser/receiver 13, an oscilloscope 14, and a calibration chart (not illustrated) to perform ultrasonic temperature measurement. In a laboratory application, a suitable ultrasonic pulse/receiver is Panametric Model 5052 PR. The oscilloscope is an HP 1743A. The pulser/receiver 13 is designed to produce a short duration positive going pulse (e.g. 10 nanoseconds) at a 20 volt level, which is at an impedance suitable for excitation of the torsional transducer 17. At the same time, the pulser/receiver 13 contains a receiver that is designed to amplify an echo signal typically of $10\mu$ volts to 10 millivolts, which is of adequate level to achieve a full scale deflection of the oscilloscope 14. The pulse output from element 13 is coupled to the oscilloscope for synchronization of the display, and the echo responses may be gated into a common display.

The oscilloscope 14 is used in a coarser temperature measurement ($\pm 2\%$) to measure the difference in time of receipt of the echoes. This may be done by making an echo to echo comparison on a common oscilloscope trace. In the case of a human observer making a temperature measurement, the echo waveforms must be recognized and human judgment must be applied in determining from the display the exact times that the events occur which are used to measure the temperature. As earlier noted, the temperature measurement herein contemplated depends upon the temperature coefficient of the elastic moulus used in propagation of torsional waves upon the interior surface of the wave propagation path provided within the sensor 15, and defined between the discontinuities at 23 and 25.

The waveform generated from the pulser/receiver 13 is indicated at 26, while the echo $\epsilon_1$ from the first discontinuity will approximate the waveform illustrated at 27, in the form that it later appears at the electrical terminals of the transducer 17. This waveform, in the ideal model, may be regarded as an initially positive going (and slightly rounded) triangular wave followed by a negative going (and slightly rounded) triangular wave. The portion of the wave which is non-reflected and which is propagated via the first discontinuity 23 continues in a torsional mode at a velocity which is dependent upon the elastic modulus of the sensing element, which in turn is dependent upon the temperature to which the sensing element is exposed. The torsional wave, which passes via the discontinuity 23, continues within the sensing element 15 until it reaches the second discontinuity at 25 at the end of the tubular element 10. The second discontinuity exists at the point where the internal chamber 29 reaches the end of the member 10 and opens to the outside. The second discontinuity causes a reflection $\epsilon_2$ of essentially all of the impinging energy.

The reflection $\epsilon_2$ from the second discontinuity is shown at 28. This waveform is also in the form that it later appears at the electrical terminals of the transducer 17. This waveform in an ideal model may be regarded as an initially positive going (and slightly rounded) triangular wave followed by a negative going (and slightly rounded) triangular wave. The reflection $\epsilon_2$ then proceeds to the left, via the discontinuity 23 (which will reflect a portion of the energy back) and permit another portion to pass into the coupling element 16 and then proceed to the transducer 17.

The mathematical basis for the waveforms for $\epsilon_1$ and $\epsilon_2$, is upon the assumption that the pulse produced by the transducer produce a positive going force (F) propagating to the right at a velocity V. At the first discontinuity 23 at which the inner diameter of the chamber 21 increases to that of the chamber 26, a decrease in force occurs on the continuing wave, and the energy balance at 23 requires that the echo $\epsilon_1$ represent a reversal in sense of the force. At the second discontinuity 25, at which the inner diameter of the chamber 29 increases to substantially infinity, a further decrease in force occurs. The energy balance here also dictates that the reflected wave represent a reversal in sense of the force. Propagation of $\epsilon_2$ via the first discontinuity, reduces it somewhat, without changing the sense, and the stress waves arriving at the transducer produce in the electrical output of the transducer the waveform, idealized at 27 and 28.

(Had the first or the second (but not both) discontinuity produced a reduced diameter as seen by the wave propagating from the transducer 17, then one reflection would have been of opposite sense to the other as seen at the electrical output of the transducer 13.)

The transducer employed in the first embodiment may take either the form illustrated in FIG. 1C, which is a torsional device, already described, or the form illustrated in FIG. 1D, typically referred to as a radial shear transducer. The diameter of the radial shear transducer is preferably considerably larger than the opening in the chamber 21, typically 0.060" vs. 0.025". This provision is to insure good coupling to the coupling element 16 in the radial shear mode. The radial shear mode is a mode which possesses axial symmetry and which propagates readily upon the internal surface of the chambers 21 or 23. The transducer under excitation in one sense may be visualized as producing a stress tending to increase the diameter of the internal chamber 21 uniformly about its circumference at the point of attachment to the coupling element 16. If the electrical excitation is reversed, the stress tends to decrease the diameter of the internal chamber 21 uniformly about its circumference at the point of attachment to the coupling element 16.

The transducer illustrated in FIG. 1D may be described as follows. It has a piezoelectric body 40 polarized as indicated by the arrows 41 in a conventional thickness direction. It may be attached by a non-conductive means (e.g. an epoxy) on its right surface to the left end of the coupling element 16. Any electroding on the right surface may adversely enter into the electromechanical operation by shorting the radial field in the transducer. The dot electrode has a diameter smaller than the base diameter of the coupling element 16, so that electric potential applied to the electrodes produces a radial electric field. If the coupling element 16 is an electrical conductor, its potential is made equal to that of the outer ring electrode, so that radial field is created to at least the inner diameter of the coupling element. The operative electrodes are the circumferential electrode 42 on the left surface of the transducer and a central dot-shaped electrode 43 centrally located on the left face of the transducer. Typically, the areas of the two electrodes are approximately equal, making the outer electrode radially thinner but circumferentially longer than the central electrode. The positioning of these two electrodes upon the upper surface permits the radial electric fields to be exerted through a high percentage of the body of the transducer.

The FIG. 1D transducer functions in the following manner. Under electrical excitation, the electrical fields applied to the electrodes 42, 43 operate radially, and orthogonally to the axial polarization arrows. The consequent mechanical motion is a shearing distortion through a cross section of the transducer. More particularly, the diameter of the left face will momentarily increase while the diameter of the right face, which bears the load of the coupling element 16, momentarily decreases, and then the reverse will occur.

The radial shear mode is readily propagated through the coupling element 16 along the internal cylindrical surface of the chamber 21 as well as via the discontinuity 23, and along the internal surface of the second chamber 29. There are differences in the equations of propagation of the radial shear mode and the torsional mode, but the two indicated discontinuities produce reflections at the output of the electrodes 42, 43 whose waveforms are of the general form illustrated at 27, 28 in relation to the torsional transducer.

The waveforms shown are characteristic of those present when the electrical circuit is a much higher impedance than the impedance of the transducer. If the electrical circuit impedance is not much higher than that of the transducer, the waveforms will be altered somewhat in shape, tending to display additional ripples.

When the radial shear mode is propagated, some loss in signal energy to the air enclosed in the chambers 21 and 29 may be encountered. This dictates that long lines (e.g. 100 feet) be evacuated.

The FIG. 1A arrangement involves interpretation of the waveforms and the timing of the events by an operator. In FIG. 2, a block diagram of an automated arrangement utilizing the same remote sensor illustrated in FIG. 1A is depicted. The illustration contains the functional blocks 51–58 which are necessary to obtain a temperature reading. The temperature is obtained digitally from a start-stop digital counter 58 responding to the waveforms sensed in the circuit by the functional blocks 53–56.

The automated ultrasonic temperature measurement system employs the pulse generator 51, which operates under the control of the control logic 52. The control logic 52 dictates the time at which the pulse generator 51 generates a short duration pulse which is coupled to the transducer 17 of the remote temperature sensor (15, 16, 17). The reflections obtained from discontinuities in the sensing element 15, are converted to electrical outputs (e.g. 27, 28) at the electrical terminals of the transducer 17. These reflections are coupled via a transmit/receive gate 53 under the control of the control logic 52 to an amplifier 54. The control logic 52 produces a signal during the presence of a pulse in the output of the signal generator, as well as during times when the reflected signal is not expected, for operating the transmit/receive gate 53. The transmit/receive gate is designed for use in the event that protection is necessary for the amplifier 54 from the high voltages (20 volts) generated by the pulse generator during the period that the transducer is electrically excited. The amplifier 54 is a low noise linear amplifier designed to bring the echo reflections which may be on the order of a few microvolts to a 1 volt level required for subsequent processing. The linear output of the amplifier 54 is applied to a threshhold detector 57 which operates upon the assumption that the amplified reflection will cross a certain threshold while incidental noise will not. The threshold detector may also have a sign sensitivity so that it will only produce an output indication to a positive going or negative going output from the amplifier corresponding to the expected sense of the reflection. When the threshold detector 57 produces an output, presumably on the positive going rise of the reflected waveform, the detector arming gate 55 is conductive, allowing the output from amplifier 55 to be coupled to the zero crossing detector 56.

Assuming that the echo response is a triangular waveform of the form noted at 27, 28, the zero crossing detector produces a first pulse which is coupled to the control logic to denote arrival of the first reflection $\epsilon_1$. A moment later, a second pulse is produced denoting the arrival of the second reflection corresponding to $\epsilon_2$. The control logic 52 then utilizes the two zero crossing signals to start and stop a digital counter. The actual count may then be converted in a suitable ROM look-up table to obtain the actual temperature.

Normally, the electronics may be used to produce a timing accuracy of about 2% assuming a short ($\frac{1}{4}"\times\frac{1}{2}"$) distance between discontinuities in the sensing element. In the event that greater accuracy is desired, the length of the sensing element should be increased. Assuming equivalent electronics, the accuracy increases approximately proportionately to the length of the sensing element.

The noise sensitivity may be further reduced by taking a large number of readings in obtaining an output indication. The pulse 26 may be repeated at 1K hertz intervals, and 100 paired reflections, for instance, may be averaged in obtaining an output indication.

The remote sensors so far described each consist of a transducer, a remote coupling element and a sensing element. In the prior cases, both the coupling and the sensing element form paths for the propagation of acoustic interior surface waves. As noted, the advantage of using interior surface wave propagation paths in coupling between the electronics (in a normal ambient temperature) and the sensor (in a hostile temperature), is that the external supports may be provided wherever convenient along the coupling element without affecting wave propagation within it. The sensing element in the event that it is short, may be mechanically supported on the end of the coupling element (e.g. made as a unitary part of the common structure as in the first embodiment). If the sensing element is of a significant length, however, the issue of support reappears, together with the advantage for interior surface wave propagation when supports are necessary. A further advantage of a hollow construction with wave propagation upon the interior, and which applies to both the coupling element and the sensing element, is that it protects both from contamination which might affect the accuracy of temperature measurement. When the sensing element is based upon the temperature of an enclosed surface, the thermal time constant may be slightly longer than the case where the outer surface of the sensing element is exposed to the thermal environment being measured. The use of interior surface wave propagation for the coupling element may be equally advantageous with either kind of sensing element.

The FIG. 3 embodiment illustrates an arrangement in which the sensing element 15' is a solid having its outer surface exposed to the environment. The sensing element is mechanically coupled to the interior of the chamber 21' of the coupling element 16' and responds to interior surface waves.

The sensing element 15' itself consists of a short, solid cylindrical member, which, in addition to its coupling to the chamber interior, includes two discontinuities. The cylindrical member has a cylindrical portion having an outer diameter substantially equal to that of the inner diameter of the chamber 21', by which it is attached to the interior of the chamber 21' by a soldered or welded connection. The member 15' then continues at a constant radius to the first discontinuity 23', which constitutes a reduction in diameter, and the end constitutes the second discontinuity. The change in diameter between the initial portion of the terminal portion of the sensor should ordinarily be less than illustrated and yet be sufficient to reflect a significant part of the energy backward from the sensing element into the interior surface of the chamber 21' of the coupling element. Ordinarily, this reduction in diameter need only be a few thousandths of an inch if the reduction continues around the perimeter of the sensor. Optionally, as suggested in relation to the discontinuity in the first embodiment, the first discontinuity of the sensor may continue around only half of the perimeter of the sensing element. This may be achieved by machining two diametrically opposed flattened surfaces, each subtending a 90° central angle.

The foregoing sensor, in the event that the electromechanical transducer is operating in a torsional mode, will vibrate in a conventional torsional mode and reflections from discontinuities 23' and 25' will occur. In the event that the transducer produces radial shear mode excitation, the sensing element will operate in what is conventionally called an extensional mode. The advantage of a transducer with an exposed external surface is that the thermal time constants may be reduced. The disadvantage of the exposed configuration is that it is subject to contamination.

Accurate ultrasonic temperature measurement is restricted to limits set by the continuity, linearity, and reproducibility of the elastic properties as a function of temperature of the materials used to make the sensing element 15. More particularly, the elastic moduli of the materials used for sensing element 15 applicable to the vibrational mode are the parameters critical to accurate temperature measurement. Materials for ultrasonic temperature measurement have a practical lower temperature limit, a practical upper temperature limit, and on occasion forbidden regions usually, but not necessarily, near the upper and lower temperature limits. Conditions which may adversely affect the elastic moduli take place when the material undergoes internal structural changes such as the removal of internal strains, annealing, displacement of grain boundaries, etc.

Assuming that the sensor is fused quartz, a temperature of approximately 16° K. appears to represent a practical lower limit and a temperature of approximately 1770° to 1870° K. a practical upper limit. Fused quartz undergoes an elastic change at the lower temperature noted, liquifies at a temperature at the maximum temperatures noted but is otherwise free of non-linearities in elastic moduli between these limits, making it well suited for ultrasonic temperature measurement throughout these temperature limits. Two materials which are frequently employed for a temperature measurement range not exceeding 1100° C. are two nickel iron alloys bearing the tradename "Hastelloy" and containing the additional subscripts "s" or "x". A material which is suitable for higher temperature applications is Tungsten, which has a melting point of 3640° K.

Accurate temperature measurement depends upon the correct selection of the materials for both elements 15 and 16. While the sensing takes place in the sensing element 15, the transfer of acoustic energy to the sensing element from the transducer, and from the sensing element to the transducer requires that the coupling element also retain good elastic properties sufficient to the task of acoustic propagation. Thus, for high temperature measurement it is necessary that both the coupling element and the sensing element have adequately high melting points.

The frequency spectrum which is useful for ultrasonic surface wave propagation is very wide indeed. The upper limits are as high as ten megahertz and the lower limits are tens of kilohertz. The upper frequency limits are normally established by the inconvenience in dimensioning very small transducers and very small sensors. There is also an increase in noise due to internal structure of the materials. The lower frequency limits are set by the tolerable sizes of the transducers and the sensors which must ordinarily be scaled larger at lower frequencies.

The measurement of temperature has been derived from measurements of ultrasonic transit time. The accuracy of temperature measurement is dependent on the accuracy with which the time of flight between the two reflecting points can be measured. Increases with the time of flight and therefore with the length of the sensing element tend to increase the accuracy of measurement. Since the sound velocity in the sensing element is determined at each point by temperature, the time of flight over the length of the sensing element represents the average temperature. A sensing element length should be chosen to represent the longest distance for which average temperature suitably represents the desired measurement. A practical minimum length, conversely, may be established by the errors of time measurement that are present in determining the time of flight. The absolute lowest limit occurs with an element length of a quarter-wavelength, in which the two reflections merge.

The advantage of interior surface wave propagation for ultrasonic temperature measurement has been explained with reference to arrangements in which the temperature of an oven 12 is to be measured. The oven 12, of FIG. 1A, for example, is provided with an insulated enclosure, and a wall opening 7, normally larger than the diameter of the sensor. The sensor 11 is inserted via this opening into the heated region of the oven. A loose, high temperature packing 8 may be inserted around the coupling 16 to prevent the escape of heat from the oven and consequent elevation of temperatures external to the oven. The sensor 11 is additionally supported in the positions illustrated in FIG. 1A by two mechanical supports 19 and 20. These are placed at convenient locations along the length of the coupling element 16, and engage the outer surface of the coupling element. As has been explained, neither the packing 18 nor the external supports 19 and 20 adversely affect the propagation of surface waves within the interior of the coupling element when the wall thickness is suitably great. The reason for this non-interference is that the acoustic energy involved in temperature measurement propagates on the interior wall of the coupling element to a definite depth. If the wall thickness of the coupling element is great enough to exceed this depth, a surface wave propagating on the interior surface of the coupling element 16 will have no perceptible effect at the outer surface 22 of the coupling element.

The wall thickness dimensioning is not critical when great enough. In practice, the inner diameter of the internal wave propagating chambers should be at least on the order of approximately 1/10th the outer diameter of the coupling element to give an acceptable degree of decoupling. This ratio tends to remain constant irrespective of the frequency.

The coupling element in practical applications may be as short as an inch and as long as 100 feet without an impractically high loss of acoustic signal. The diameter of the coupling element in some applications may be very small, less than ⅛", but the more practical range is from ⅛" to ¼" in outer diameter.

What is claimed is:

1. In an ultrasonic temperature measuring arrangement, the combination comprising:

A. a first acoustic wave propagating element having a first end, a second end, and an internal cylindrical surface extending between said ends providing a propagation path for an acoustic interior surface wave with axial symmetry, the wall thickness of said first element being greater than the depth of penetration of said surface waves to permit external mechanical support without significant affect upon the propagation of said interior waves, B. an electromechanical transducer mechanically coupled to the first end of said first element and having a pair of electrical terminals, said transducer when electrically energized, launching acoustic surface waves with axial symmetry on said interior surface toward said second end and when electrically unenergized, electrically responding to acoustic waves propagating on said interior surface and impinging on said first end, C. a second acoustic wave propagating element of a given length having an internal cylindrical surface between a first end and a second end providing a propagation path for interior surface waves, the second end of said first element being acoustically coupled to the first end of said second element, a first discontinuity disposed in the propagation path provided by said elements and allowing bidirectional propagation, said first discontinuity constituting a step-like change in diameter less than the depth of penetration of said surface waves, which upon the incidence of acoustic energy, reflects a part and propagates a part, a second discontinuity, disposed in said second element at a greater distance than said first discontinuity from said transducer, which upon incidence of acoustic energy propagating therto via said first discontinuity reflects a part thereof toward said transducer, said second reflection propagating as an interior surface wave within said first element, said propagation path between said two discontinuities being subject to the thermal conditions under measurement and having a given temperature dependent elastic modulus with a corresponding temperature dependent velocity of acoustic wave propagation, and D. a cap to seal the interior at the second end of said second element, the interior of said cap being spaced from the second end of said second element for acoustic decoupling.

* * * * *